US010228923B2

(12) United States Patent
Yatou et al.

(10) Patent No.: US 10,228,923 B2
(45) Date of Patent: Mar. 12, 2019

(54) PARALLELIZATION COMPILING METHOD, PARALLELIZATION COMPILER, AND VEHICULAR DEVICE

(71) Applicants: DENSO CORPORATION, Kariya, Aichi-pref. (JP); WASEDA UNIVERSITY, Shinjuku-ku, Tokyo (JP)

(72) Inventors: Yoshihiro Yatou, Kariya (JP); Noriyuki Suzuki, Kariya (JP); Kenichi Mineda, Kariya (JP); Hironori Kasahara, Tokyo (JP); Keiji Kimura, Tokyo (JP); Hiroki Mikami, Nishitokyo (JP); Dan Umeda, Tokyo (JP)

(73) Assignees: DENSO CORPORATION, Kariya (JP); WASEDA UNIVERSITY, Tokyo (JP)

( * ) Notice: Subject to any disclaimer, the term of this patent is extended or adjusted under 35 U.S.C. 154(b) by 201 days.

(21) Appl. No.: 15/083,502

(22) Filed: Mar. 29, 2016

(65) Prior Publication Data

US 2016/0291950 A1    Oct. 6, 2016

(30) Foreign Application Priority Data

Mar. 31, 2015   (JP) .................................. 2015-72813

(51) Int. Cl.
*G06F 9/44*   (2018.01)
*G06F 8/41*   (2018.01)
*G06F 9/52*   (2006.01)

(52) U.S. Cl.
CPC ............. *G06F 8/458* (2013.01); *G06F 8/454* (2013.01); *G06F 8/456* (2013.01); *G06F 9/52* (2013.01); *G06F 8/433* (2013.01)

(58) Field of Classification Search
CPC ... G06F 8/41; G06F 8/45; G06F 8/433; G06F 8/458
See application file for complete search history.

(56) References Cited

U.S. PATENT DOCUMENTS

| 2003/0131346 | A1  | 7/2003 | Kalogeropulos |
| 2004/0172626 | A1* | 9/2004 | Jalan ................. G06F 8/456 717/149 |

(Continued)

FOREIGN PATENT DOCUMENTS

| JP | 2004-252728 A | 9/2004 |
| WO | WO-2014115613 A1 * | 7/2014 ............. G06F 8/456 |

OTHER PUBLICATIONS

U.S. Appl. No. 15/083,526, filed Mar. 29, 2016, Nobuta et al.
U.S. Appl. No. 15/083,592, filed Mar. 29, 2016, Mineda et al.

*Primary Examiner* — Duy Khuong T Nguyen
(74) *Attorney, Agent, or Firm* — Posz Law Group, PLC

(57) ABSTRACT

A parallelization compiling method for generating a segmented program from a sequential program, in which multiple macro tasks are included and at least two of the macro tasks have a data dependency relationship with one another, includes determining an existence of invalidation information for invalidating at least a part of the data dependency relationship between the at least two of the plurality of macro tasks before compiling the sequential program into the segmented program, and generating the segmented program by compiling the sequential program into the segmented program with reference to a determination result of the existence of the invalidation information. When the invalidation information is determined to exist, the at least a part of the data dependency relationship is invalidated before the compiling of the sequential program into the segmented program.

18 Claims, 19 Drawing Sheets

(56) References Cited

U.S. PATENT DOCUMENTS

| | | | |
|---|---|---|---|
| 2007/0038987 A1* | 2/2007 | Ohara | G06F 8/45 |
| | | | 717/151 |
| 2008/0086617 A1 | 4/2008 | Kasahara et al. | |
| 2009/0138862 A1 | 5/2009 | Tanabe et al. | |
| 2010/0070958 A1* | 3/2010 | Takagi | G06F 8/456 |
| | | | 717/149 |
| 2010/0174876 A1 | 7/2010 | Kasahara et al. | |
| 2010/0229161 A1* | 9/2010 | Mori | G06F 8/456 |
| | | | 717/149 |
| 2012/0254551 A1 | 10/2012 | Kasahara et al. | |
| 2012/0260239 A1* | 10/2012 | Martinez Canedo | G05B 19/05 |
| | | | 717/149 |
| 2014/0372995 A1 | 12/2014 | Mori et al. | |
| 2016/0291948 A1* | 10/2016 | Nobuta | G06F 8/451 |

* cited by examiner

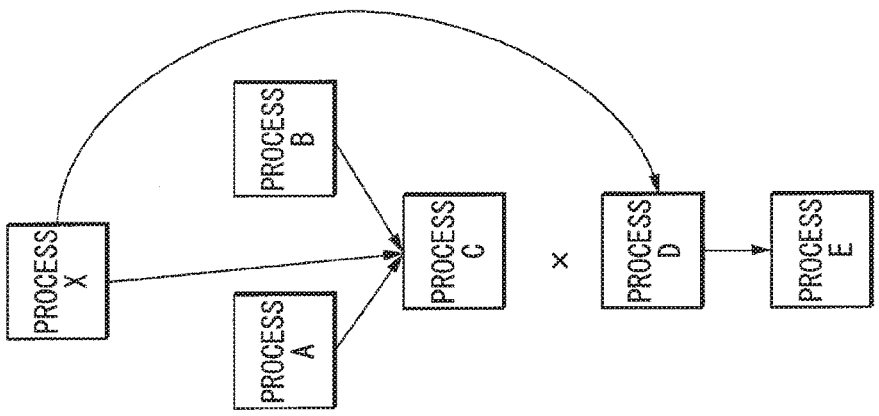
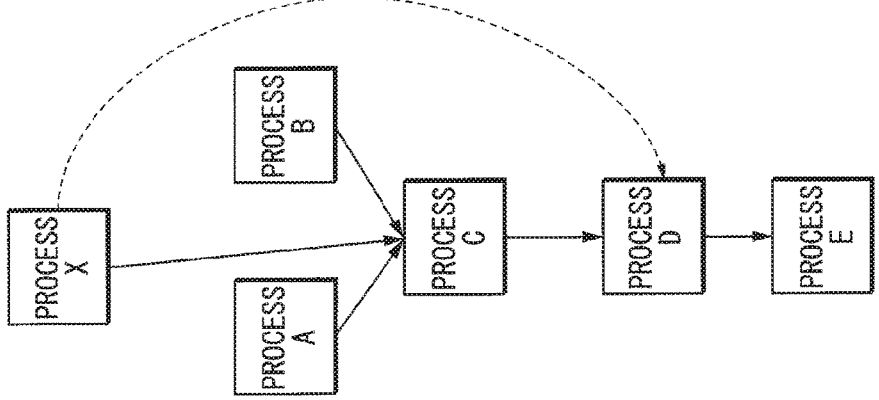

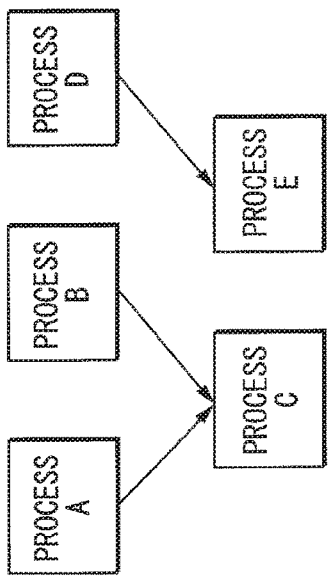
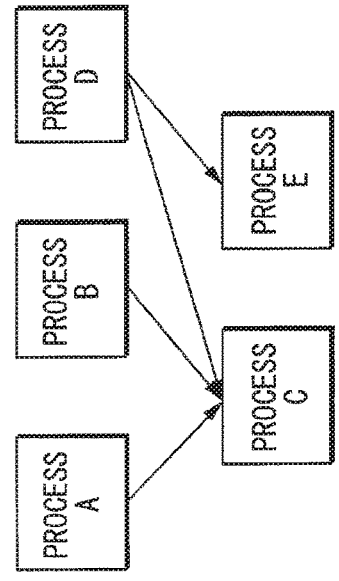
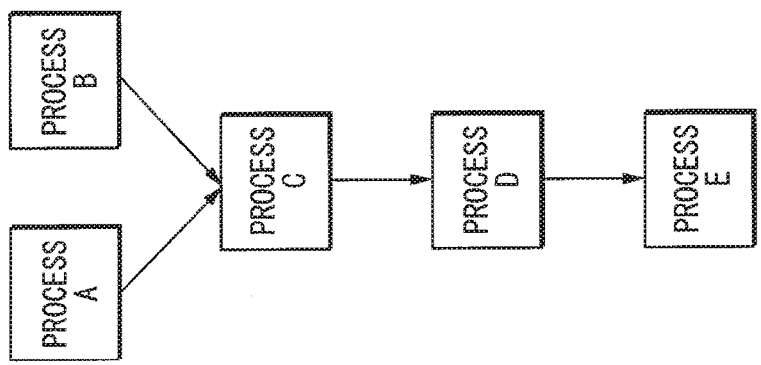

PARALLELIZATION COMPILING METHOD, PARALLELIZATION COMPILER, AND VEHICULAR DEVICE

CROSS REFERENCE TO RELATED APPLICATION

This application is based on Japanese Patent Application No. 2015-072813 filed on Mar. 31, 2015, the disclosure of which is incorporated herein by reference.

TECHNICAL FIELD

The present disclosure relates to a parallelization compiling method, a parallelization compiler, and a vehicular device, each of which generates a segmented parallelized program for a multi-core processor from a sequential program prepared for a single-core processor.

BACKGROUND

In order to sophisticate and integrate a control system and an information system in a vehicle, it is important to obtain a higher capacity of a processor for implementing the sophistication and the integration. For example, in order to sophisticate an engine control system playing an important role in development of a vehicle which is safe, comfortable and excellent in fuel economy, an increase in a calculation load, such as a sophistication of a control algorithm or a realization of a new control function is required. In order to solve the above problem, an increase of a processing speed of a processor for realizing a real-time control is indispensable.

However, it is difficult to improve an operating frequency of the processor as in the conventional art because power consumption is increased in proportion to the cube of the frequency. For that reason, multiple processor cores having a low operating frequency are integrated on one chip together, and the processor cores that are reduced in the frequency and the voltage for power consumption reduction are operated in parallel manner, to thereby transit to a multi-core processor that can realize an increase in the processing speed and a reduction in the power consumption at the same time at a rapid pace.

In order that the multi-core processor performs the processing at a higher speed than that of the single-core processor, a process of a sequential program for the single-core processor needs to be divided into sub-processes, and the respective sub-processes need to be assigned to respective processing cores so that a communication among the respective processing cores is minimized. Up to now, the work for parallelizing the sequential program as described above needs to be manually performed. However, such work is very difficult, and requires a long period of time, and suffers from many problems such as an increase in development costs and the reliability of the parallelized program.

JP 2015-001807 A (corresponding to US 2014/0372995 A1) proposes a parallelization compiling method that is capable of creating a parallelized program for a vehicular device built-in system which is high in reliability and can perform high-speed processing while suppressing a development period of time and the development costs.

In a conventional parallelization technology, a sequential program prepared for a single-core processor is compiled into a segmented program for the multi-core processor with consideration of a data dependency between multiple macro tasks and an execution duration after segmentation. In the sequential program of an automotive field, the data dependency between the multiple macro tasks included in the sequential program becomes complicated, which makes it difficult to take all of those data dependencies into consideration. Moreover, when the segmented program is generated with consideration of the data dependency, the segmented program is restricted by the data dependency. As a result, the execution duration of the generated program cannot be averaged, and the effect of the parallelization cannot be sufficiently produced.

SUMMARY

In view of the foregoing difficulties, it is an object of the present disclosure to provide a parallelization compiling method, a parallelization compiler, and a vehicular device each of which is capable of averaging an execution duration of a parallelized program, which is generated based on a sequential program, even when macro tasks included in the sequential program mutually have a complicated data dependency.

According to a first aspect of the present disclosure, a parallelization compiling method is used for generating a segmented program, which is executable by a multi-core processor, from a sequential program, which is executable by a single-core processor, by parallelizing the sequential program. The sequential program includes multiple macro tasks and at least two of the multiple macro tasks have a data dependency relationship with one another. The parallelization compiling method includes determining an existence of invalidation information for invalidating at least a part of the data dependency relationship between the at least two of the multiple macro tasks before compiling the sequential program into the segmented program, and generating the segmented program by compiling the sequential program into the segmented program with reference to a determination result of the existence of the invalidation information. When the invalidation information is determined to exist, the at least a part of the data dependency relationship is invalidated before the compiling of the sequential program into the segmented program.

According to a second aspect of the present disclosure, a parallelization compiler is stored in a non-transitory tangible computer readable storage medium as a program product, and the parallelization compiler generates a segmented program, which is executable by a multi-core processor, from a sequential program, which is executable by a single-core processor, by parallelizing the sequential program. The sequential program includes multiple macro tasks and at least two of the macro tasks have a data dependency relationship with one another. The parallelization compiler includes instructions to be executed by a parallelization compiling device, and the instructions for implementing determining an existence of invalidation information for invalidating at least a part of the data dependency relationship between the at least two of the multiple macro tasks before compiling the sequential program into the segmented program, and generating the segmented program by compiling the sequential program into the segmented program with reference to a determination result of the existence of the invalidation information. When the invalidation information is determined to exist, the at least a part of the data dependency relationship is invalidated before the compiling of the sequential program into the segmented program.

According to a third aspect of the present disclosure, a vehicular device includes a multi-core processor, which operates based on a segmented program executable by the multi-core processor. The segmented program is generated by parallelization from a sequential program executable by a single-core processor. The sequential program includes multiple macro tasks and at least two of the multiple macro tasks have a data dependency relationship with one another. The multi-core processor is configured to determine an existence of invalidation information for invalidating at least a part of the data dependency relationship between the at least two of the multiple macro tasks before compiling the sequential program into the segmented program, and generate the segmented program by compiling the sequential program into the segmented program with reference to a determination result of the existence of the invalidation information. When the invalidation information is determined to exist, the at least a part of the data dependency relationship is invalidated before the compiling of the sequential program into the segmented program.

According to the above parallelization compiling method, parallelization compiler, and vehicular device, the execution duration of the parallelized program can be effectively averaged even when the macro tasks included in the sequential program, based on which the parallelized program is generated, mutually have a complicated data dependency with one another.

BRIEF DESCRIPTION OF THE DRAWINGS

The above and other objects, features and advantages of the present disclosure will become more apparent from the following detailed description made with reference to the accompanying drawings. In the drawings:

FIG. 17A and FIG. 17B are diagrams illustrating a parallelization compiling method when data dependency relationship invalidation information exists;

FIG. 19A to FIG. 19C are diagrams illustrating a parallelization compiling method when data dependency relationship invalidation information exists.

DETAILED DESCRIPTION

Figure 1:
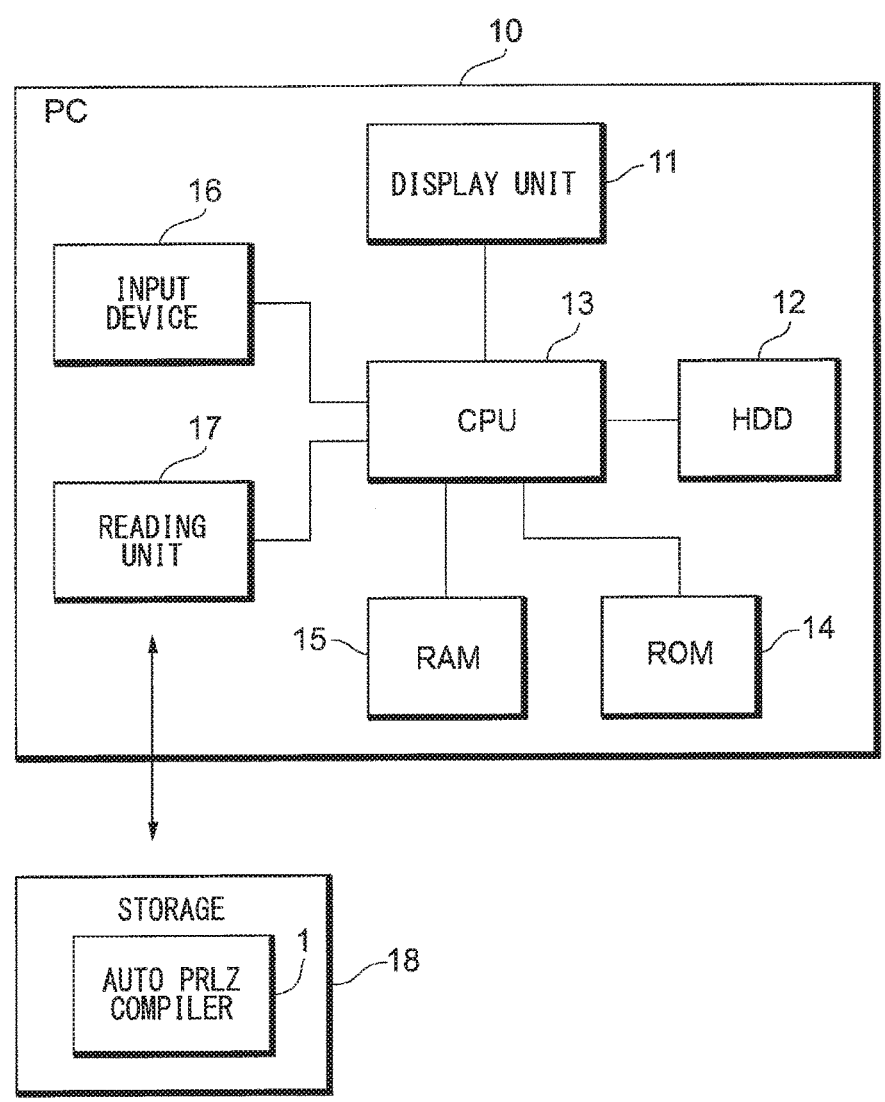
FIG. 1 is a block diagram illustrating a parallelization compiler according to a first embodiment, a second embodiment, and a third embodiment of the present disclosure.

The following will describe an embodiment of the present disclosure with reference to the accompanying drawings. For the purpose of facilitating understanding of a description, the same or equivalent components in the respective drawings are denoted by identical reference numerals and redundant description will be omitted.

1: Automatic Parallelization Compiler

An automatic parallelization compiler according to a first embodiment, a second embodiment, and a third embodiment of the present disclosure has a function of generating a parallelized program (segmented program) for a multi-core processor system of a built-in system. The parallelized program is also referred to as a segmented program, and is generated from a sequential program, which is also referred to as a source program. Herein, the sequential program is prepared for a single-core processor system of a built-in system.

1-1. Design Concept of Automatic Parallelization Compiler

The automatic parallelization compiler according to the present embodiment has the following functions.

(1) Multi-grain parallel processing (2) Insertion of static scheduling code during compiling (3) Generation of dynamic scheduling code during execution (4) Realization of hierarchical macro data flow (5) Segmentation/aggregation of macro task, parallelism extraction of loop distribution/interchange (6) Improvement in data transmission efficiency by data localization (7) Power consumption reduction by compiler 1-2. Internal Processing of Automatic Parallelization Compiler The automatic parallelization compiler has three stages of a front end (FE), a middle path (MP), and a back end (BE). Each of these stages is independent from one another when being executed, and code transfer is performed by an intermediate language generated from the FE and the MP.

The FE is configured to perform a lexical analysis and a syntax analysis of a source code of the sequential program and generate a parsable intermediate language in the MP. The intermediate language generated by the FE is basically expressed by a parse tree having four operands, and forms one block as a whole and is not structured.

The MP is configured to perform a control dependency analysis, a data dependency analysis, optimization and the like, and performs multi-grain parallel processing of coarse grain, medium grain, and near fine grain parallelization with the use of data.

The BE is configured to read a parallelization intermediate language generated by the MP and generate an actual machine code. The BE has a BE for generating an assembler code of a multi-core architecture that is targeted as well as a BE for generating a parallelized Fortran code and a C code for OpenMP. In addition, the BE has a BE for outputting codes corresponding to a variety of architectures such as a BE for generating a code parallelized with the inclusion of a memory arrangement and data transmission by a parallelization API to be described later.

1-3. Parallelism Analysis of Automatic Parallelization Compiler

The automatic parallelization compiler performs a macro data flow processing for segmenting a sequential program into three kinds of coarse grain tasks a basic block (BB), a repetition block (RB), and a subroutine block (SB). The coarse grain task is also referred to as a macro task (MT). In some cases, the macro data flow processing suffers from such a problem that a utilization efficiency of the processor is not enhanced due to a shape of the program, and a sufficient coarse grain parallelism cannot be extracted.

Under the circumstances, the automatic parallelization compiler employs hierarchical macro data flow processing that expands a conventional single hierarchical macro data flow processing technique, and hierarchically uses macro data flow processing within the MT. In the hierarchical macro data flow processing, the MT is hierarchically defined, and the parallelism between the macro tasks is analyzed for each hierarchy.

(Generation of Macro Flow Graph (MFG))

The automatic parallelization compiler first analyzes a control dependency and a data dependency between the macro tasks for the generated macro tasks of the respective hierarchies. The analysis results are expressed as a macro flow graph (MFG).

(Generation of Macro Task Graph (MTG))

The MFG represents the control dependency and the data dependency among the macro tasks, but does not represent the parallelism. In order to extract the parallelism, it is necessary to analyze an earliest executable condition considering both of the control dependency and the data dependency. The earliest executable condition is a condition under which the MT is executable at an earliest time point, and is obtained from the following execution conditions.

(1) When an MTi is data-dependent on an MTj, the MTi cannot be executed until the execution of the MTj is completed.

(2) When a conditional branch destination of the MTj is determined, the MTi control-depending on the MTj can be executed even if the execution of the MTj is not completed.

Accordingly, a general form of an earliest executable condition is expressed as follows.

Earliest executable condition: (the MTj on which the MTi is control-dependent is branched to the MTi) AND ((an MTk ($0 \leq k \leq |N|$) on which the MTi is data-dependent is completed) OR (it is determined that the MTk is not executed)).

The earliest executable condition of the macro task is represented by a macro task graph (MTG).

1-4. Multi-Grain Parallel Processing

The automatic parallelization compiler realizes, in addition to the conventional loop parallelization, multi-grain parallel processing that effectively combines a coarse grain task parallel processing with a near fine grain parallel processing (refer to "parallelism detection method between Fortran program coarse grain tasks" in Institute of Electronics, Information and Communication Engineers Journal, 1990 by Hiroki Honda, Masahiko Iwata, and Hironori Kasahara). The coarse grain task parallel processing uses the parallelism between the coarse grain tasks between loops and between the subroutines, and the near fine grain parallel processing uses the parallelism between statements.

(Coarse Grain Task Parallel Processing)

The automatic parallelization compiler generates a macro flow graph (MFG) representing the control dependency and the data dependency between the MTs of the BB, the RB, and the SB. The automatic parallelization compiler further expresses the parallelism of the MTs extracted from the MFG by the earliest executable condition analysis as the macro task graph (MTG) (refer to "parallelism detection method between Fortran program coarse grain tasks" in Institute of Electronics, Information and Communication Engineers Journal, 1990 by Hiroki Honda, Masahiko Iwata, and Hironori Kasahara and "Macro task generation method of Fortran macro data flow processing", IEICE, 1992, Vol. J75-D-I, No. 8, pp. 511-525 by Kasahara, Goda, Yoshida, Okamoto, and Honda,).

Thereafter, the automatic parallelization compiler assigns the MT on the MTG to a processor group (PG) into which one or more processor elements (PE) are grouped.

(Medium Grain Parallel Processing)

The MT assigned to the PG is subjected to medium grain parallel processing by a processor within a processor cluster if the parallel processing is enabled in the MT in a DOALL loop or at an iteration level. The medium grain parallel processing represents parallel processing using the parallelism between DO loop iterations, and is most general in the parallel processing in the multi-core processor.

(Near Fine Grain Parallel Processing)

The parallel processing of the statement level for the near-fine grain tasks is called "near fine grain parallel processing". As a result, the parallel execution can be performed in the statement without dependency, and an execution duration is reduced.

1-5. Macro Task Scheduling

In the coarse grain task parallel processing, the macro task generated in each hierarchy is assigned to the PG and executed. A scheduling technique for determining to which PG the macro task is assigned includes a dynamic scheduling and a static scheduling, which will be described below, and those scheduling are selected on the basis of a shape of the macro task graph, an execution time non-determinacy and the like.

(Dynamic Scheduling)

When the execution time uncertainty such as conditional branching is present, the macro task is assigned to the PG during the execution by the dynamic scheduling. The dynamic scheduling routine operates a macro task execution management table according to the termination of the macro task or the determination of a branch direction, and examines the earliest executable condition for each macro task.

If the macro tasks can be executed, the macro tasks are put into a ready queue. The macro tasks within the ready queue are sorted according to its priority, and a head macro task in the ready queue is assigned to the processor cluster of an idle state.

Also, at the time of generating the dynamic scheduling code, a centralized scheduling system and a distributed scheduling system can be selectively used according to the number of processors to be used, and a synchronization overhead of the system. In the centralized scheduling system, one dedicated processor performs scheduling, and in the distributed scheduling system, a scheduling function is distributed to the respective processors.

(Static Scheduling)

On the other hand, the static scheduling is a system used when the macro task graph has only a data dependency edge, in which the automatic parallelization compiler determines the assignment of the macro task to the PG during the compiling.

The static scheduling can be effectively used for the scheduling of the task fine in the grain because the static scheduling can eliminate an execution time scheduling overhead, and minimize the overhead synchronous with data transmission.

During the static scheduling, the costs of the task are applied with a task cost estimate value in the automatic parallelization compiler, but the task scheduling can be performed in a real cost with the use of a profile automatic feedback function of the automatic parallelization compiler.

When the profile automatic feedback function is used, the sequential program is decomposed into the MT as a first phase, and a profiler function is inserted for each MT to generate the sequential program. In the profiler function, a task execution cost (clock cycle) and the number of times of task execution are measured. The sequential program into which the profiler function is inserted is executed on a machine to be targeted once, and a file having information on the task execution cost and the number of times of tasks on the machine to be targeted is output.

Then, in a second phase, the parallel zed program scheduled on the basis of the real cost is generated with the output file and the sequential program as inputs.

1-6. Data Localization

The automatic parallelization compiler can perform a cache optimization over the entire program. When the automatic parallelization compiler finds that there is a data dependency between the loops after analyzing the parallelism, the automatic parallelization compiler attempts the global optimization of the cache between the loops having the dependency (refer to Japanese Patent No, 4177681).

Specifically, a sequence to be accessed in each loop is investigated, and the same split loops are adjusted to access to the same sequence portion, to thereby assign the same split loop to the same processor. As a result, in the same split loop, all of sequence data is reused in a cache.

The above localization technology has evolved into a local memory management, and data transmission technology described below (refer to GB Patent No. 2,478,874).

(1) When a local memory or distributed shared memory of an arbitrary size is provided, before the memory is accessed with the use of a DMA (DTU) (refer to Japanese Patent No. 4476267), data is pre-loaded into the local or distributed shared memory in close proximity to the processor, and reused in the program throughout.

(2) When a destination memory is full, after a DTU of a destination processor is informed by a synchronization flag that data has been transferred into the shared memory or the like according to a transfer priority order from the memory, the DTU transfers the data into a memory that is automatically empty.

(3) When data to be reused in the future is not used for a while, and an area of the memory needs to be emptied, the DTU retracts the data into a centralized shared memory behind a task execution by the CPU, and reloads the data into the memory till a use time.

1-7. Generation of Parallelized Program

In the generation of the parallelized program in the automatic parallelization compiler, parallelization can be performed in source-to-source such as parallelization C or parallelization Fortran with the use of automatic parallelization API (refer to "Optimally Scheduled Advanced Multiprocessor Application Program Interface", 2008 by Waseda University).

In that case, in order to make the parallelized program executable in a variety of platforms, the automatic parallelization compiler converts a directive portion of the C or Fortran for each processor into a run-time library call with the use of, for example, an automatic parallelization API standard interpretation system to be described later. The automatic parallelization API standard is an example of a predetermined standard. Thereafter, when the automatic parallelization compiler sequentially compiles a code for each processor to generate a binary, and links the generated binary, the automatic parallelization compiler can execute the parallelized program on the multi-core processor to be targeted.

2. Parallelization Procedure and Technique of Sequential Program for Built-In System The following will describe the feature of the sequential program for the built-in system and a parallelizing technique using the automatic parallelization compiler according to the present embodiment. The built-in system may be, for example, a vehicular device or an electronic device other than the vehicular device. The sequential program may be automatically generated by a model base design (as an example, sequential program automatically generated by Matlab (registered trademark) or Simulink (registered trademark) provided by MathWorks, Inc.).

The automatic parallelization compiler is configured by a conditional branch and an assignment statement, performs inline expansion and renaming on the sequential program fine in the processing, and extracts the parallelism. The automatic parallelization compiler performs a task aggregation for a conditional branch concealment for the purpose of complying with real-time, and performs static scheduling so that overhead becomes low. Furthermore, in order to perform the static scheduling in the real cost, the automatic parallelization compiler may employ the profile automatic feedback function.

In addition, in the sequential program, a conditional compilation for selecting a description to be compiled according to each type of the built-in system different in destination, function, and the configuration of hardware may be performed by a conditional compilation switch (command to the preprocessor). In such a case, information (information indicative of the destination, etc.) corresponding to any type is set as an argument of each conditional compilation switch of the sequential program to generate a binary code corresponding to the type from the sequential program.

On the contrary, the automatic parallelization compiler according to the present embodiment ignores the selection of a target to be compiled by the conditional compilation, performs the segmentation of the macro task, the extraction of parallelism, and static scheduling for all portions of the sequential program, and the like and generates the parallelized program. Thereafter, the automatic parallelization compiler identifies a description to be excluded from compilation by the conditional compilation, and generates binary data for operating the multi-core processor from the parallelized program in a state where the above description is excluded.

2-1. Operating Environment of Automatic Parallelization Compiler

An automatic parallelization compiler (AUTO PRLZ COMPILER) 1 is provided to a user in a state to be stored in a storage medium (STORAGE) 18 configured by an optical disc such as a digital versatile disc (DVD), a compact disk read-only memory (CD-ROM), a universal serial bus (USB) memory, or a memory card (registered trademark), a magnetic disc, or a semiconductor memory (refer to FIG. 1). It is needless to say that the automatic parallelization compiler 1 may be supplied to the user through a network.

A personal computer (PC) 10 in which the automatic parallelization compiler 1 is installed operates as an automatic parallelization compiling device. The PC 10 includes a display unit 11, a hard disk driver (HDD) 12, a central processing unit (CPU) 13, a read-only memory (ROM) 14, a random access memory (RAM) 15, an input device 16, and a reading unit 17.

The display unit 11 displays an image for the user based on an image signal transmitted from the CPU 13.

The input device 16 is configured by a keyboard a mouse and the like, and operated by the user to output a signal corresponding to the operation to the CPU 13.

The reading unit 17 is configured to read data from the storage medium 18 in which the automatic parallelization compiler 1 and so on are stored.

The RAM 15 is a readable and writable volatile memory, the ROM 14 is a read-only nonvolatile memory, and the HDD 12 is a readable and writable nonvolatile memory. Programs to be read and executed by the CPU 13 and the like are stored in the ROM 14 and the HDD 12 in advance.

The RAM 15 is used as a storage area for temporarily storing the programs or a storage area for temporarily storing data for work when the CPU 13 executes the programs stored in the ROM 14 and the HDD 12.

The CPU13 reads an OS from the HDD 12 to execute the OS, and executes a variety of programs recorded in the HDD 12 as a process on the OS. The CPU 13 receives an input of a signal from the input device 16 as occasion demands, outputs the image signal to the display unit 11, and controls the read/write of the data with respect to the RAM 15 and the HDD 12.

The automatic parallelization compiler 1 read from the storage medium 18 through the reading unit 17 is installed in the PC 10, and the automatic parallelization compiler 1 functions as one of applications that are stored in the HDD 12, and executed as a process on the OS.

In addition, the automatic parallelization compiling device is used in the development of the parallelized program for the built-in system such as the vehicular device. However, the automatic parallelization compiling device is not limited to the above, but can be used in the development of the parallelized program for a built-in system for various applications, such as information appliances, or the development of the parallelized program in other applications aside from the built-in system.

3. Configuration of Vehicular Device

Figure 2:
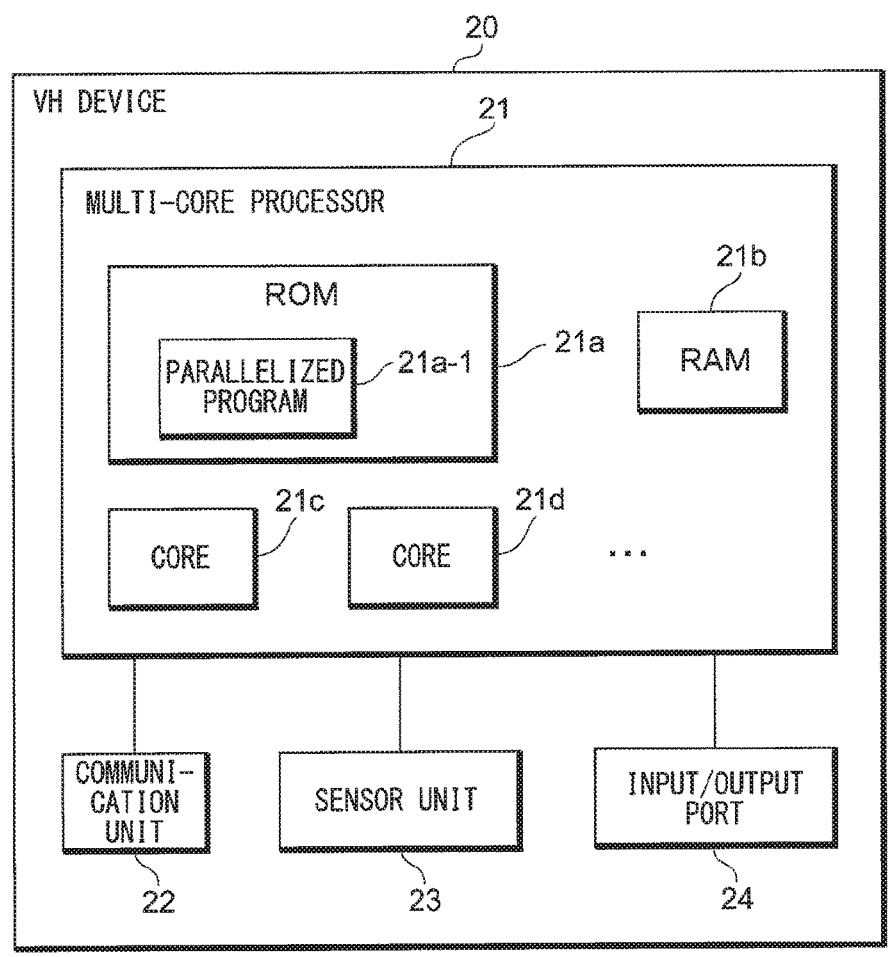
FIG. 2 is a block diagram illustrating a vehicular device according to the first embodiment, the second embodiment, and the third embodiment of the present disclosure.

The following will describe a configuration of a vehicular device (VH DEVICE) 20 that operates by the aid of the parallelized program generated by the automatic parallelization compiler 1 of the present embodiment with reference to FIG. 2. It is needless to say that the automatic parallelization compiler 1 is not limited to the vehicular device 20, but can generate the parallelized program for operating a variety of electronic devices having the same configuration.

The vehicular device 20 includes a multi-core processor 21, a communication unit 22, a sensor unit 23, an input/output port 24 and the like.

The multi-core processor 21 includes a ROM 21a, a RAM 21b, and multiple cores 21c, 21d, etc.

The ROM 21a stores a parallelized program 21a-1 (binary data) generated by the automatic parallelization compiler 1 therein. The multi-core processor 21 operates according to the parallelized program 21a-1, and comprehensively controls the vehicular device 20.

The RAM 21b is configured to be accessed by the cores 21c, 21d, etc. The communication unit 22 is configured to communicate with another ECU connected to the communication unit 22 through an in-vehicle LAN or the like.

The sensor unit 23 is configured by a variety of sensors for detecting a state of an object to be controlled and the like. The input/output port 24 is configured to transmit and receive a variety of signals for controlling the object to be controlled.

SPECIFIC EXAMPLES

The following will describe specific examples of the processing for generating the parallelized program by the automatic parallelization compiler 1 of the present embodiment. In the following description, although a process A and so on are described, the process A and so on represents a description of a series of processes including various operations, assignments, branching processing, function calls and so on.

First Embodiment

Figure 3:
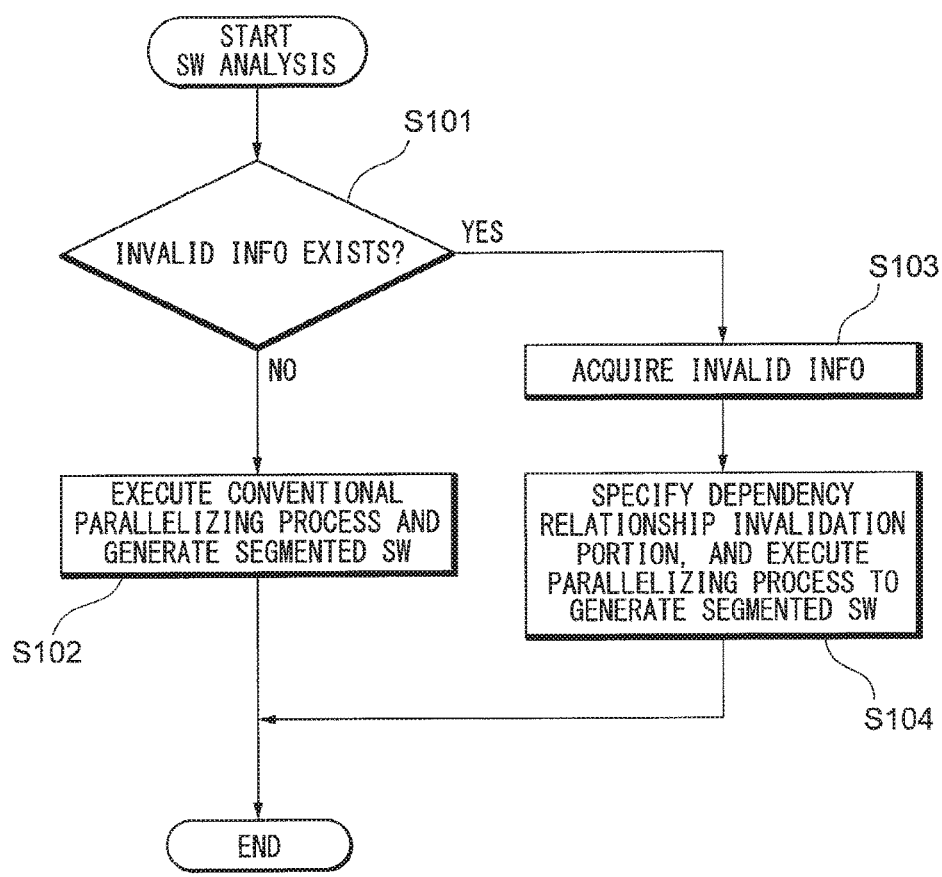
FIG. 3 is a flowchart illustrating a parallelization compiling method according to the first embodiment of the present disclosure.

FIG. 3 shows a parallelization compiling method according to a first embodiment, and this parallelization compiling method may be executed by the automatic parallelization compiling device 10. At S101, an existence of data dependency relationship invalidation information (INVALID INFO) is determined (corresponding to invalidation determination unit). If there is the data dependency relationship invalidation information, a flow proceeds to a process of S103, and if there is no data dependency relationship invalidation information, the flow proceeds to a process of S102. The data dependency relationship invalidation information is preliminarily defined in the sequential program between two or more macro tasks, and is also referred to as invalidation information for simplification.

Figure 4:
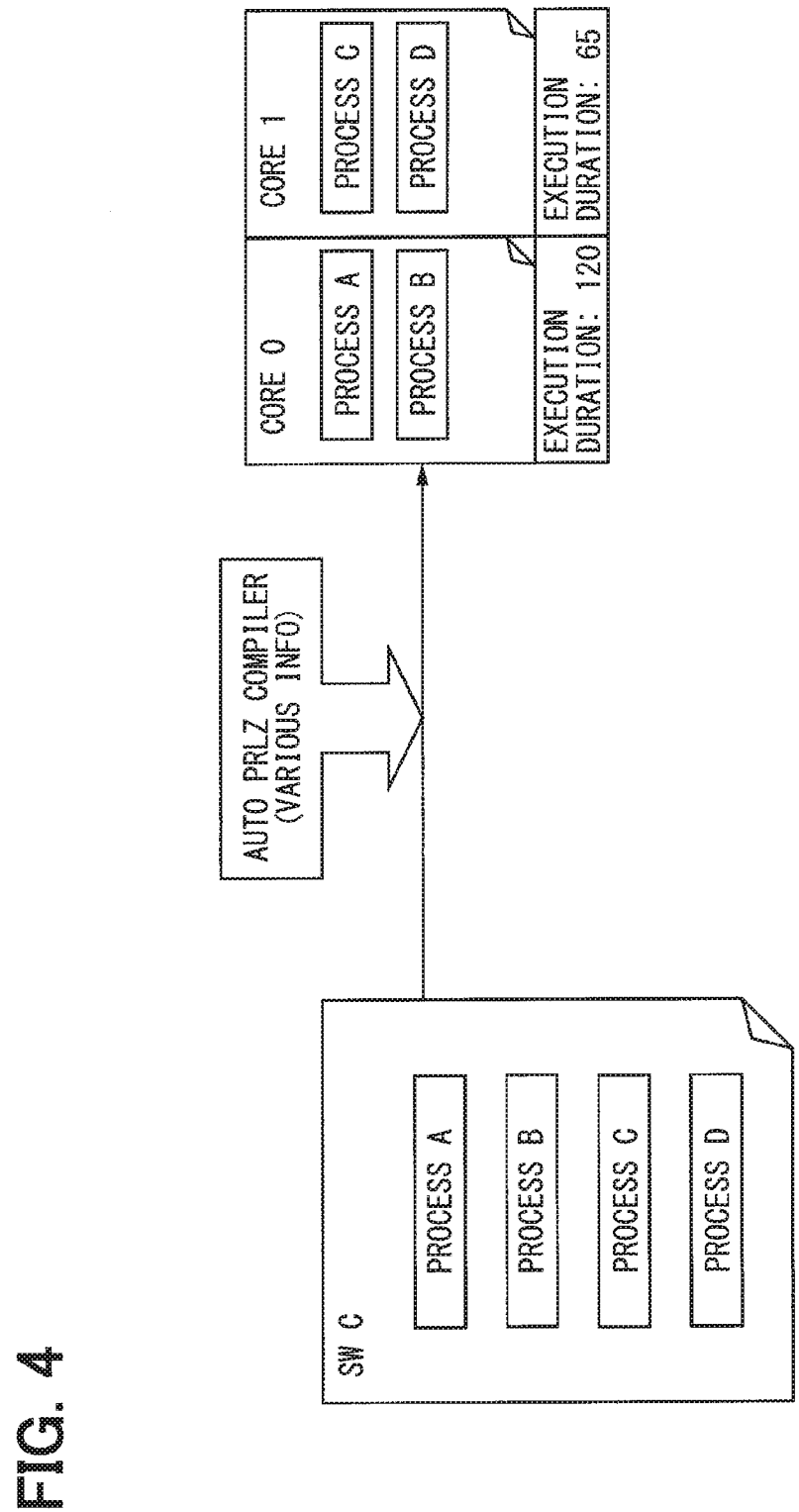
FIG. 4 is a diagram illustrating a parallelization compiling method when no data dependency relationship invalidation information exists.

In S102, the same parallelizing process as that in the conventional art is executed to generate a segmented program. One of specific examples in the generation of the segmented program is illustrated in FIG. 4. As illustrated in FIG. 4, it is assumed that a software (SW) C that is a sequential program includes a process A, a process B, a process C, and a process D, and a data dependency relationship is present between the process A and the process B. It is assumed that an execution duration of the process A is 100, an execution duration of the process B is 20, an execution duration of the process C is 30, and an execution duration of the process D is 35 (values of those execution durations are relative values).

Since the process A and the process B have a dependency relationship, the process A and the process B are assigned to a core 0. The process C and the process D are assigned to the core 1 so that the overall execution duration becomes shortest in the above assumption. In this example, an execution duration of the core 0 is 120, and an execution duration of a core 1 is 65.

In S103, data dependency relationship invalidation information is acquired. In this example, it is assumed that there is data dependency relationship invalidation information that the data dependency relationship may be invalidated between the process A and the process B. In S104 subsequent to S103, a dependency relationship invalidation portion is specified, and a parallelizing process is executed to generate a segmented program (corresponding to generation unit).

Figure 5:
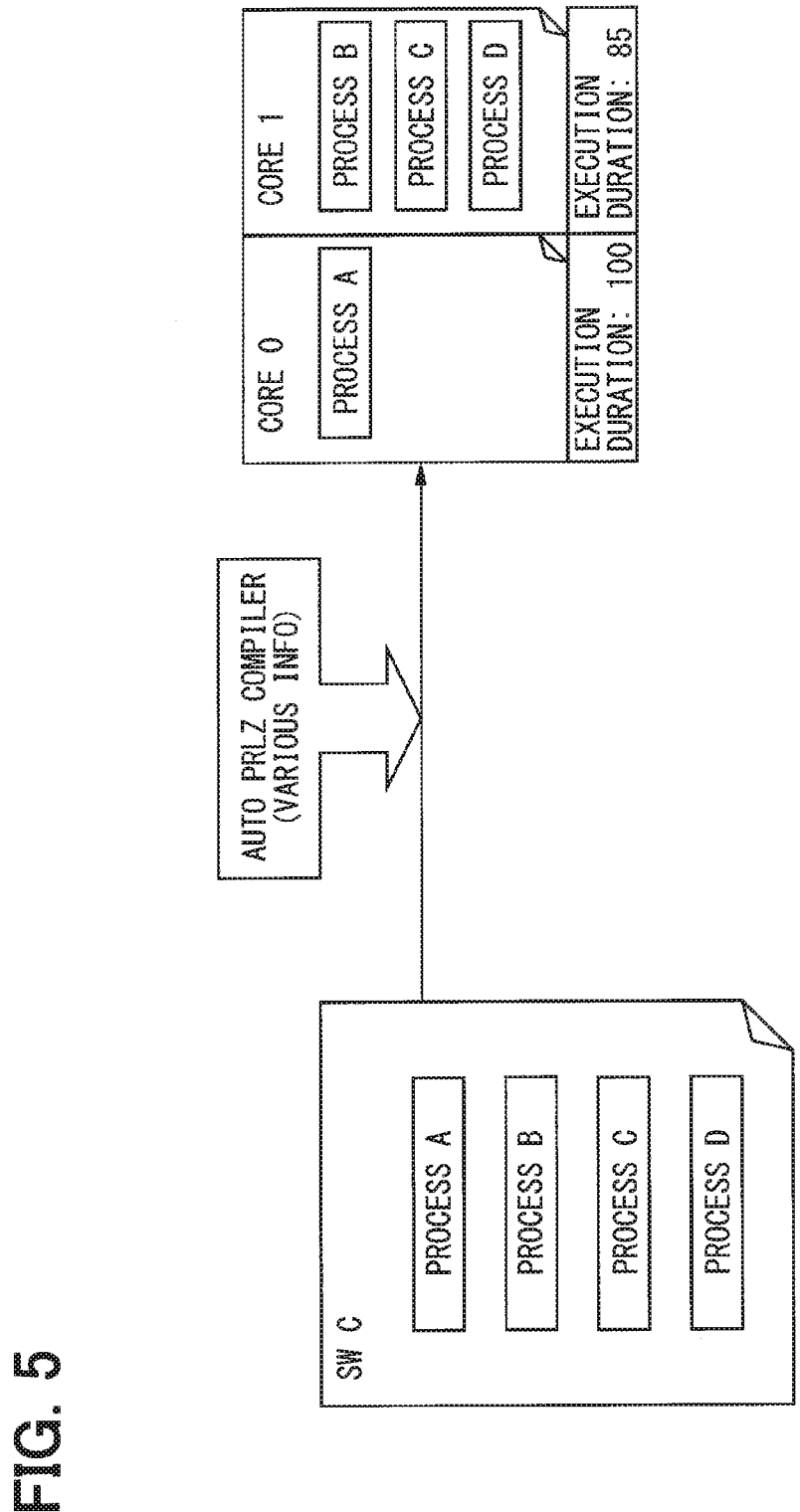
FIG. 5 is a diagram illustrating a parallelization compiling method when data dependency relationship invalidation information exists.

One of specific examples in the generation of the segmented program is illustrated in FIG. 5. As illustrated in FIG. 5, it is assumed that a software C that is a sequential program includes the process A, the process B, the process C, and the process D, and a data dependency relationship is present between the process A and the process B. It is assumed that an execution duration of the process A is 100, an execution duration of the process B is 20, an execution duration of the process C is 30, and an execution duration of the process D is 35 (values of those execution durations are relative values).

First, the dependency relationship between the process A and the process B is invalidated. Since a dependency relationship between the process A and the process B is eliminated, the parallelizing process is performed so that the overall execution duration becomes shortest. In this example, the process A is assigned to the core 0, and the process B, the process C, and the process D are assigned to the core 1. In this example, the execution duration of the core 0 is 100, and the execution duration of the core 1 is 85. As compared with the example described in the process of S102, the overall execution duration is improved.

Second Embodiment

Figure 6:
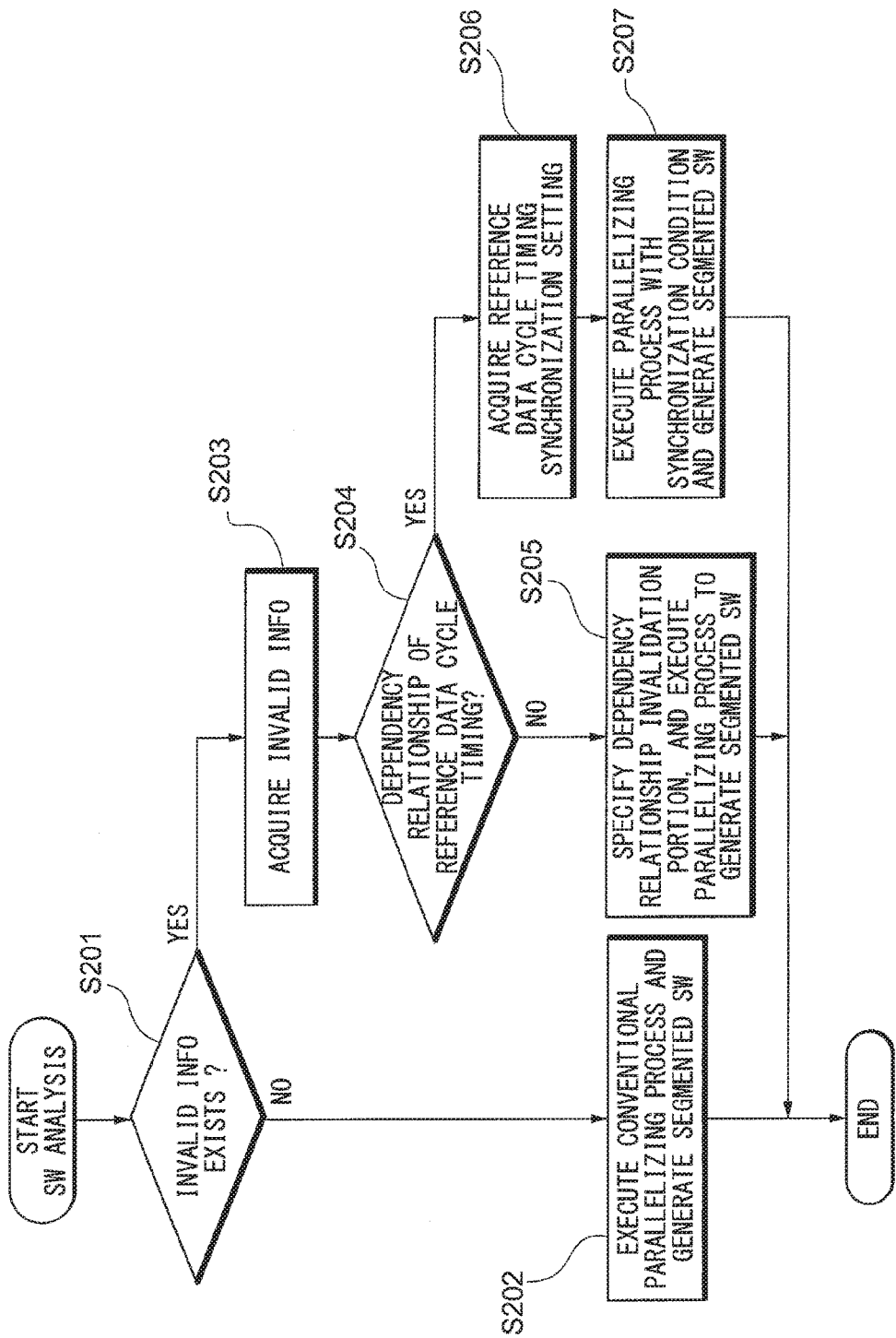
FIG. 6 is a flowchart illustrating a parallelization compiling method according to the second embodiment of the present disclosure.

FIG. 6 shows a parallelization compiling method according to a second embodiment, and this parallelization compiling method may be executed by the automatic parallelization compiling device 10. In S201, an existence of data dependency relationship invalidation information is determined (corresponding to invalidation determination unit). If there is the data dependency relationship invalidation information, a flow proceeds to a process of S203, and if there is no data dependency relationship invalidation information, the flow proceeds to a process of S202.

Figure 7:
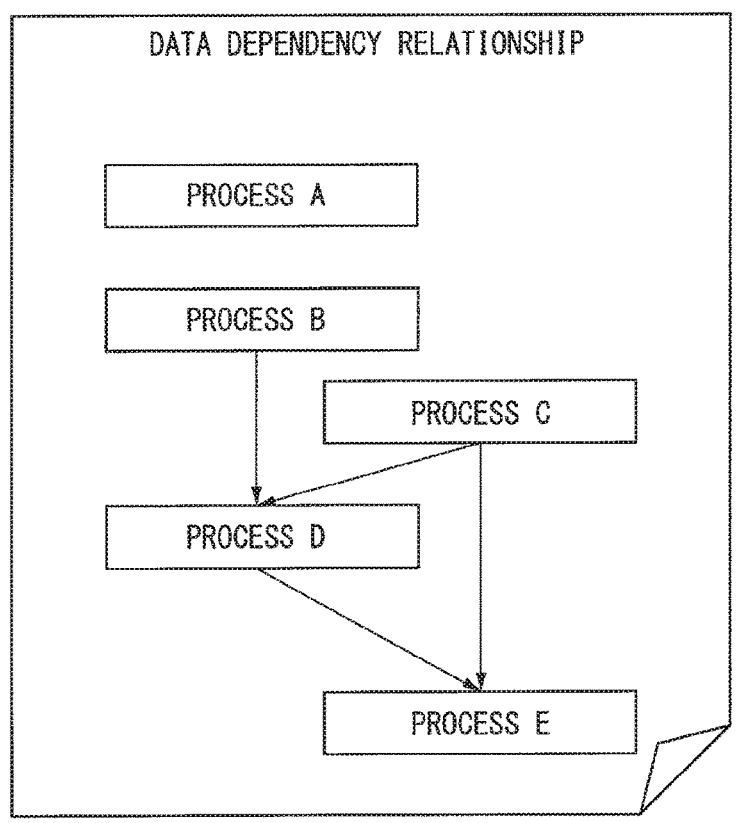
FIG. 7 is a diagram illustrating an example of a data dependency relationship in the parallelization compiling method according to the second embodiment of the present disclosure.
Figure 8:
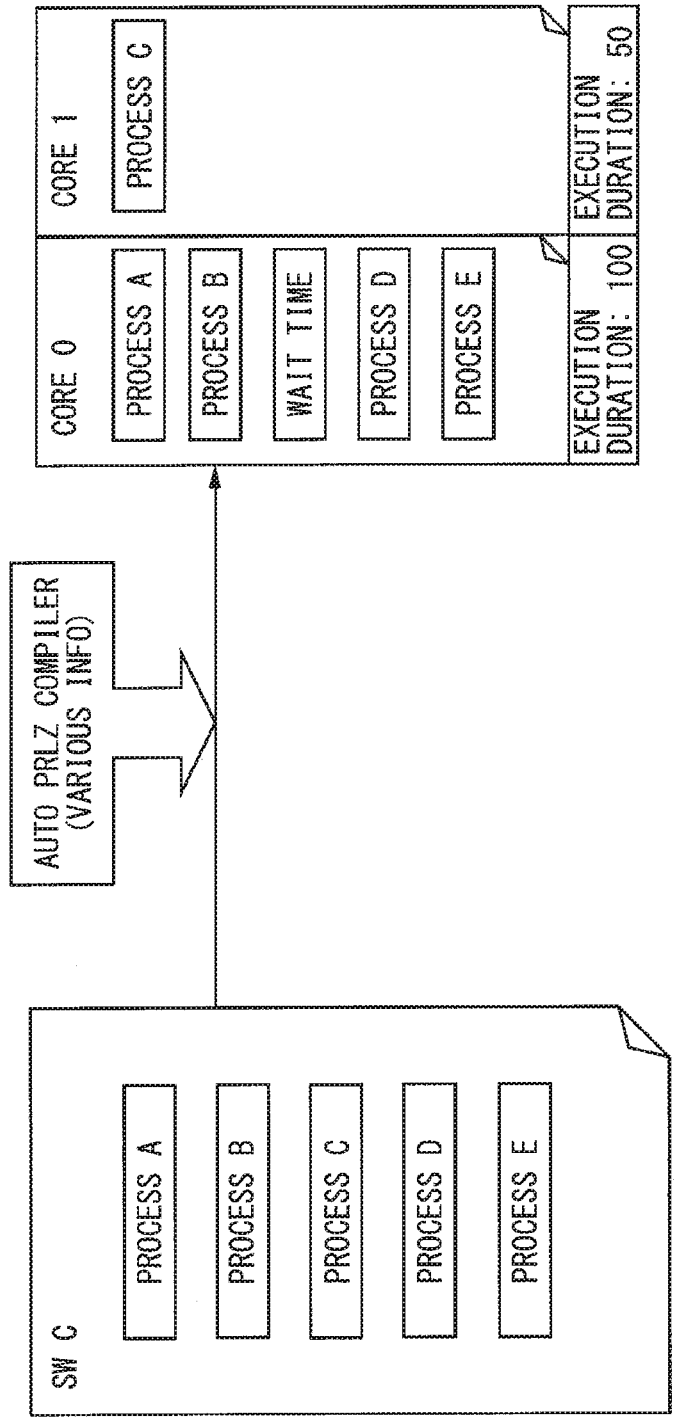
FIG. 8 is a diagram illustrating a parallelization compiling method when no data dependency relationship invalidation information exists.

In S202, the same parallelizing process as that in the conventional art is executed to generate a segmented program. One of specific examples in the generation of the segmented program is illustrated in FIG. 8. As illustrated in FIG. 8, a software C that is a sequential program includes a process A, a process B, a process C, a process D, and a process E. The process A to the process E have a data dependency relationship illustrated in FIG. 7. As illustrated in FIG. 7, it is assumed that there are the respective data dependency relationships between the process B and the process D, between the process C and the process D as well as the process E, and between the process D and the process E. It is assumed that an execution duration of the process A is 15, an execution duration of the process B is 10, an execution duration of the process C is 50, an execution duration of the process D is 30, and an execution duration of the process E is 20 (values of those execution durations are relative values).

Taking those data dependency relationships into account, the process A, the process B, the process D, and the process E are assigned to the core 0 so that the overall execution duration becomes shortest, and the process C is assigned to the core 1. A waiting time is provided between the process B and the process D so as to maintain the data dependency relationship between the process C and the process D. In this example, an execution duration of the core 0 is 100, and an execution duration of the core 1 is 50.

In S203, data dependency relationship invalidation information is acquired. In this example, it is assumed that there is data dependency relationship invalidation information that the data dependency relationship may be invalidated between the process C and the process D.

In S204 subsequent to S203, it is determined whether there is a dependency relationship of a reference data cycle timing (processing synchronous timing), or not (corresponding to timing determination unit). If there is the dependency relationship of the reference data cycle timing, the flow proceeds to a process of S206, and if there is no dependency relationship of the reference data cycle timing, the flow proceeds to a process of S205.

The reason that the reference data cycle timing is thus confirmed is because even if the segmented program is generated on the basis of the execution duration of each process, the execution duration is not a constant value but an average value or a maximum value, and therefore an actual execution duration may be increased or decreased. When the execution duration is thus increased or decreased, even if the invalidation of the data dependency relationship is permitted, inconvenience occurs between the respective processes whose context is to be maintained. Therefore, it is additionally necessary to maintain the context. In S204, this matter is confirmed.

In S205, a dependency relationship invalidation portion is specified, and a parallelizing process is executed to generate a segmented program (corresponding to generation unit).

Figure 9:
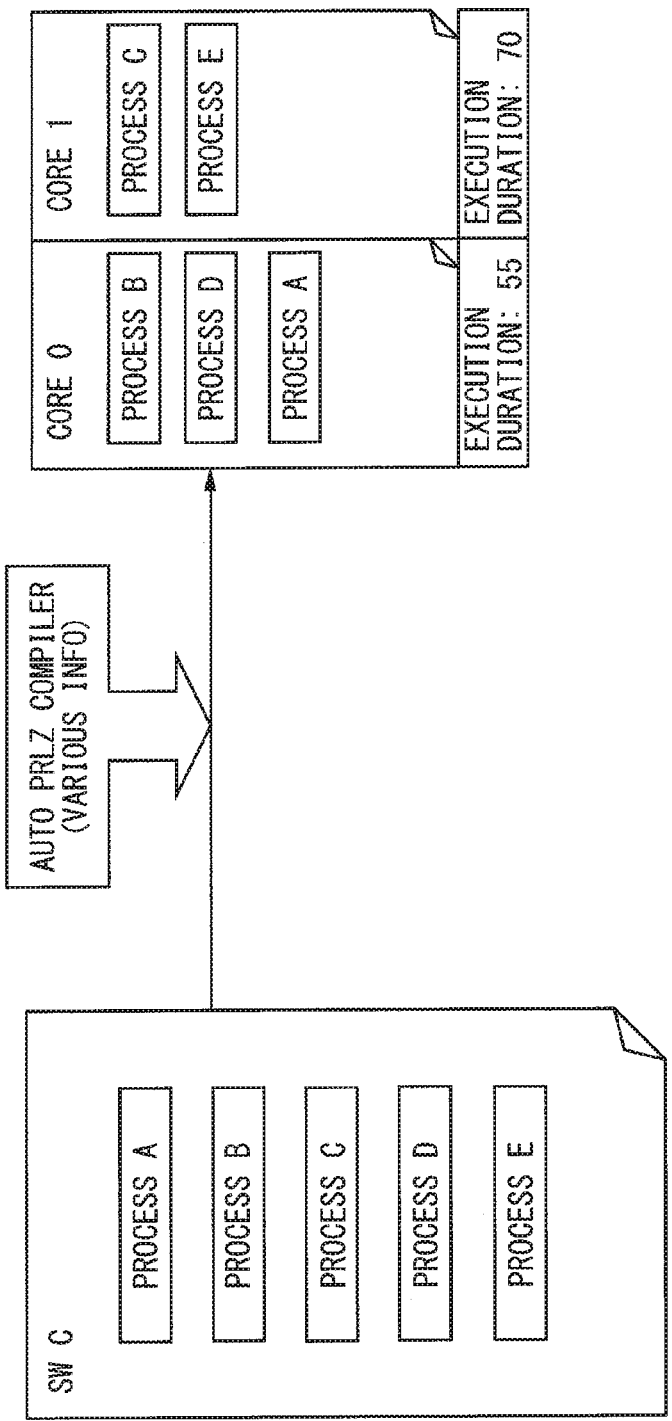
FIG. 9 is a diagram illustrating a parallelization compiling method when data dependency relationship invalidation information exists.

One of specific examples in the generation of the segmented program is illustrated in FIG. 9. As illustrated in FIG. 9, it is assumed that the software C that is a sequential program includes the process A, the process B, the process C, the process D and the process E, and there is a data dependency relationship illustrated in FIG. 7, First, the data dependency relationship illustrated in FIG. 7 is invalidated. Since the data dependency relationship is eliminated, the parallelizing process is performed so that the overall execution duration becomes shortest. In this example, the process B, the process D, and the process A are assigned to the core 0, and the process C, and the process E are assigned to the core 1. In this example, an execution duration of the core 0 is 55, and an execution duration of the core 1 is 70.

In S206, a reference data cycle timing synchronization setting is acquired. In this example, the execution of the process D after the process C is a condition for prevention of replacement for each processing cycle.

Figure 10:
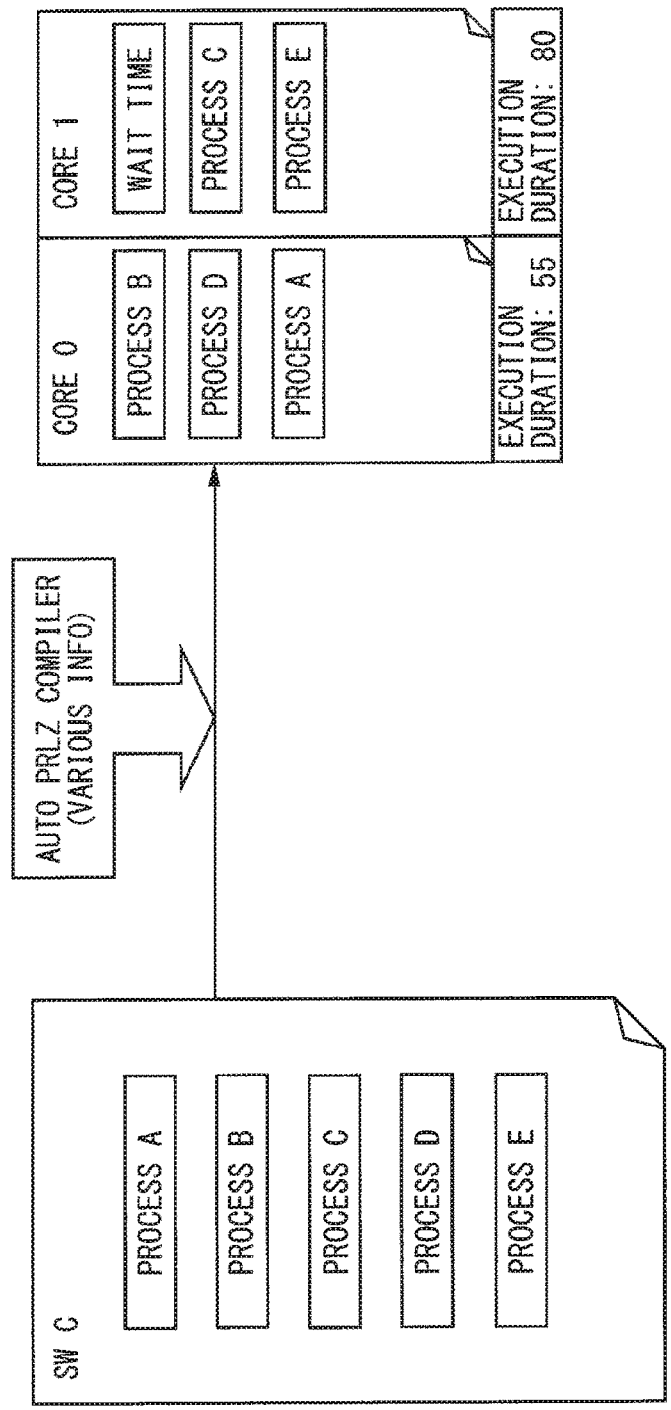
FIG. 10 is a diagram illustrating a parallelization compiling method when data dependency relationship invalidation information and a synchronization condition exist.

In S207 subsequent to S206, a parallelizing process with a synchronization condition is executed to generate a segmented program. FIG. 10 illustrates an example of the parallelizing process with the synchronization condition. An example of the start synchronization is illustrated in FIG. 10. The process B, the process D, and the process A are assigned to the core 1, and the process C and the process E are assigned to the core 0. In order to prevent an execution order of the process D and the process C from being replaced with each other, a wait time for adjusting a start time of the process C is provided. In this example, an execution duration of the core 0 is 55, and an execution duration of the core 1 is 80.

Figure 11:
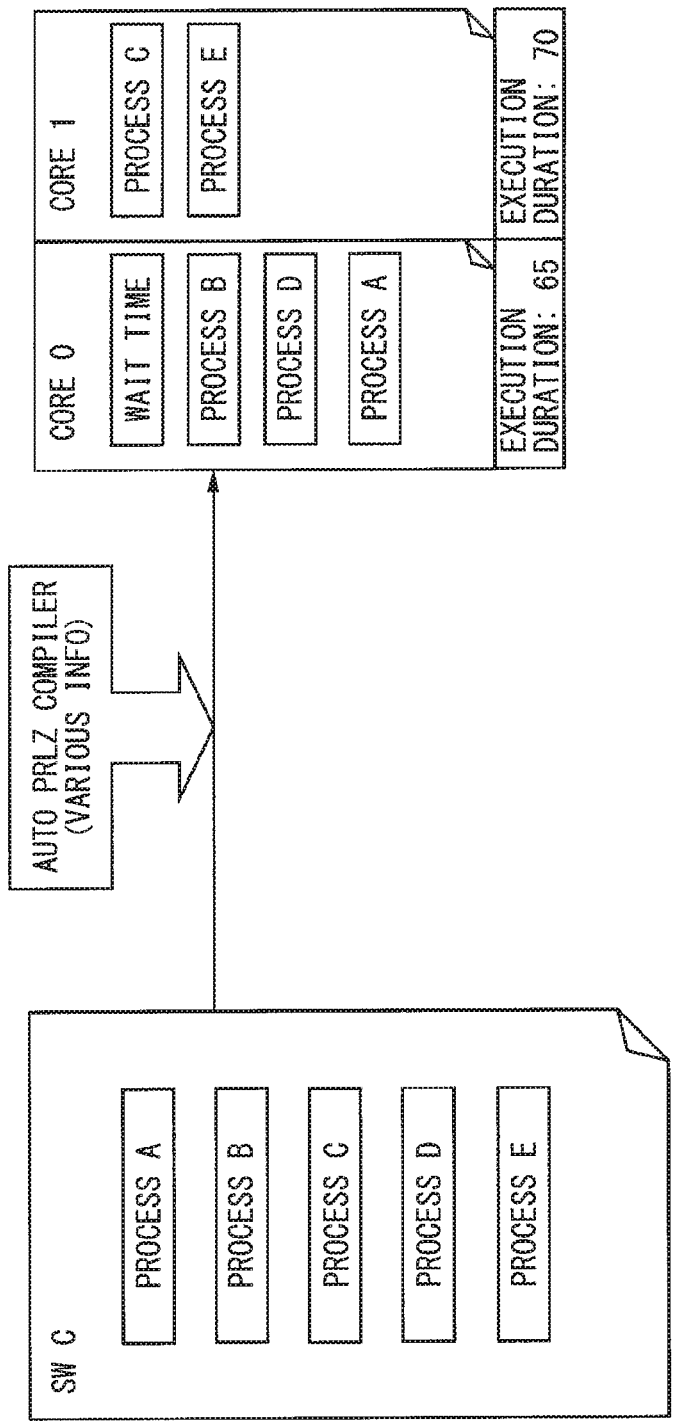
FIG. 11 is a diagram illustrating a parallelization compiling method when data dependency relationship invalidation information and a synchronization condition exist.

FIG. 11 illustrates another example of the parallelizing process with the synchronization condition. An example of the end synchronization is illustrated in FIG. 11. The process B, the process D, and the process A are assigned to the core 1, and the process C and the process E are assigned to the core 0. In order to prevent an execution order of the process D and the process C from being replaced with each other, a wait time for adjusting an end time of the process D is provided. In this example, an execution duration of the core 0 is 65, and an execution duration of the core 1 is 70.

Whether the start synchronization illustrated in FIG. 10 or the end synchronization illustrated in FIG. 11 is used, is determined according to another condition to be prioritized. For example, if the overall execution duration is to be reduced, the end synchronization illustrated in FIG. 11 is used. If the shorter execution duration is more emphasized, the start synchronization illustrated in FIG. 10 is used. As another condition to be prioritized, a processing amount of each core, a capacity of a memory or the like is used.

Third Embodiment

Figure 12:
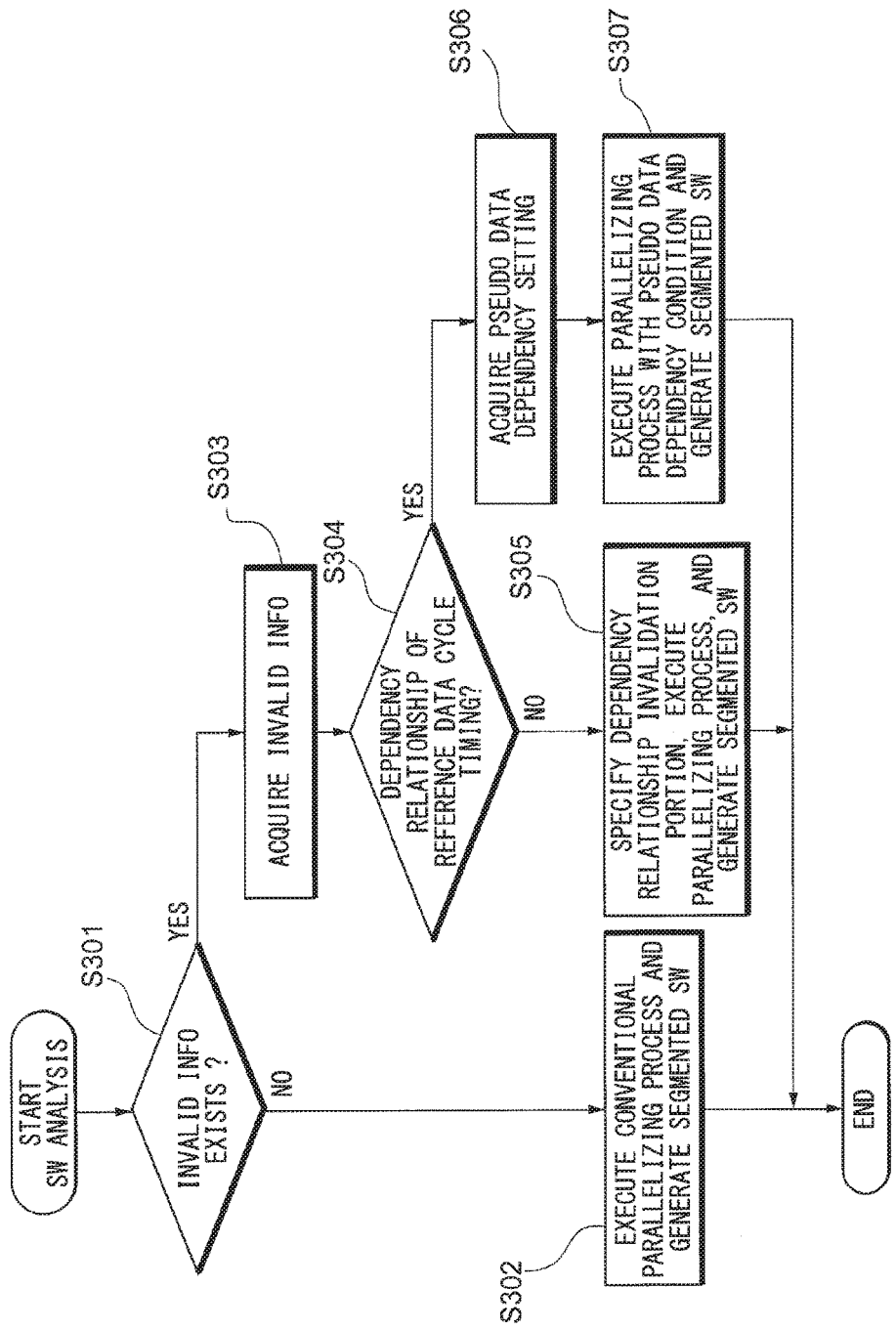
FIG. 12 is a flowchart illustrating a parallelization compiling method according to the third embodiment of the present disclosure.

FIG. 12 shows a parallelization compiling method according to a third embodiment, and this parallelization compiling method may be executed by the automatic parallelization compiling device 10. In S301, an existence of data dependency relationship invalidation information is determined (corresponding to invalidation determination unit). If there is the data dependency relationship invalidation information, a flow proceeds to a process of S303, and if there is no data dependency relationship invalidation information, the flow proceeds to a process of S302.

Figure 13:
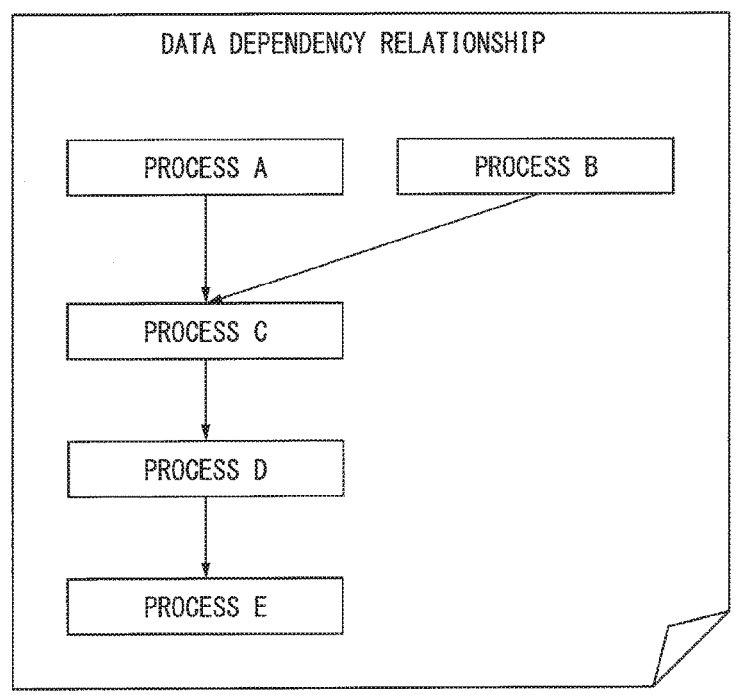
FIG. 13 is a diagram illustrating an example of a data dependency relationship in a parallelization compiling method according to the third embodiment of the present disclosure.
Figure 14:
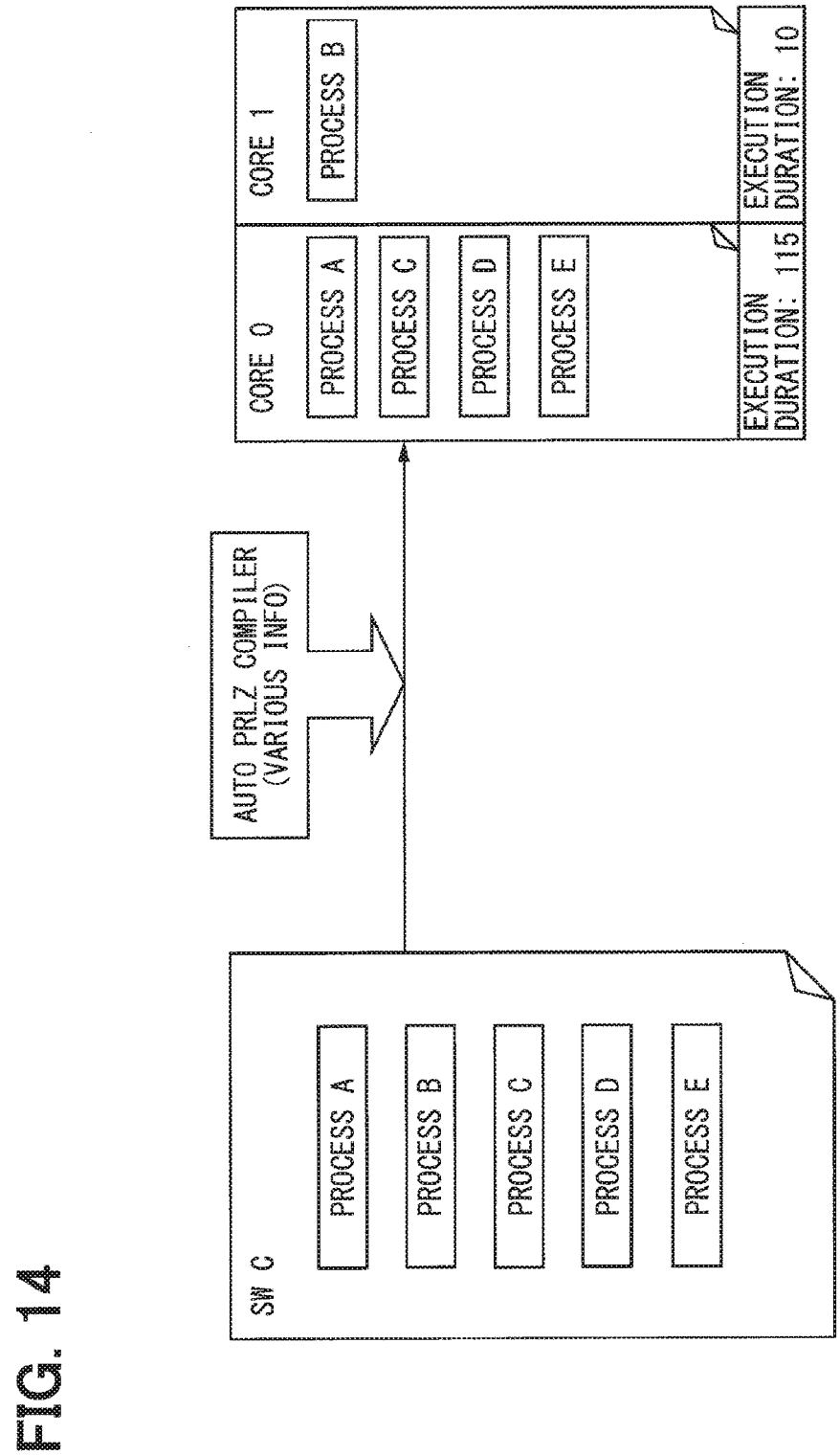
FIG. 14 is a diagram illustrating a parallelization compiling method when no data dependency relationship invalidation information exists.

In S302, the same parallelizing process as that in the conventional art is executed to generate a segmented program. One of specific examples in the generation of the segmented program is illustrated in FIG. 14. As illustrated in FIG. 14, a software C that is a sequential program includes a process A, a process B, a process C, a process D, and a process E. The process A to the process E have a data dependency relationship illustrated in FIG. 13. As illustrated in FIG. 13, it is assumed that there are the respective data dependency relationships between the process A and the process C, between the process B and the process C, between the process C and the process D, and between the process D and the process E. It is assumed that an execution duration of the process A is 15, an execution duration of the process B is 10, an execution duration of the process C is 30, an execution duration of the process D is 50, and an execution duration of the process E is 20 (values of those execution durations are relative values).

Taking those data dependency relationships into account, the process A, the process C, the process D, and the process E are assigned to the core 0 so that the overall execution duration becomes shortest, and the process B is assigned to the core 1. In this example, an execution duration of the core 0 is 115, and an execution duration of the core 1 is 10.

In S303, data dependency relationship invalidation information is acquired. In this example, it is assumed that there is data dependency relationship invalidation information that the data dependency relationship may be invalidated between the process C and the process D.

In S304 subsequent to S303, it is determined whether there is a dependency relationship of a reference data cycle timing (processing synchronous timing), or not (corresponding to timing determination unit). If there is the dependency relationship of the reference data cycle timing, the flow proceeds to a process of S306, and if there is no dependency relationship of the reference data cycle timing, the flow proceeds to a process of S305.

The reason that the reference data cycle timing is thus confirmed is because even if the segmented program is generated on the basis of the execution duration of each process, the execution duration is not a constant value but an average value or a maximum value, and therefore an actual execution duration may be increased or decreased. When the execution duration is thus increased or decreased, even if the invalidation of the data dependency relationship is permitted, inconvenience occurs between the respective processes whose context is to be maintained. Therefore, it is additionally necessary to maintain the context. In S304, this matter is confirmed.

In S305, a dependency relationship invalidation portion is specified, and a parallelizing process is executed to generate a segmented program (corresponding to generation unit).

Figure 15:
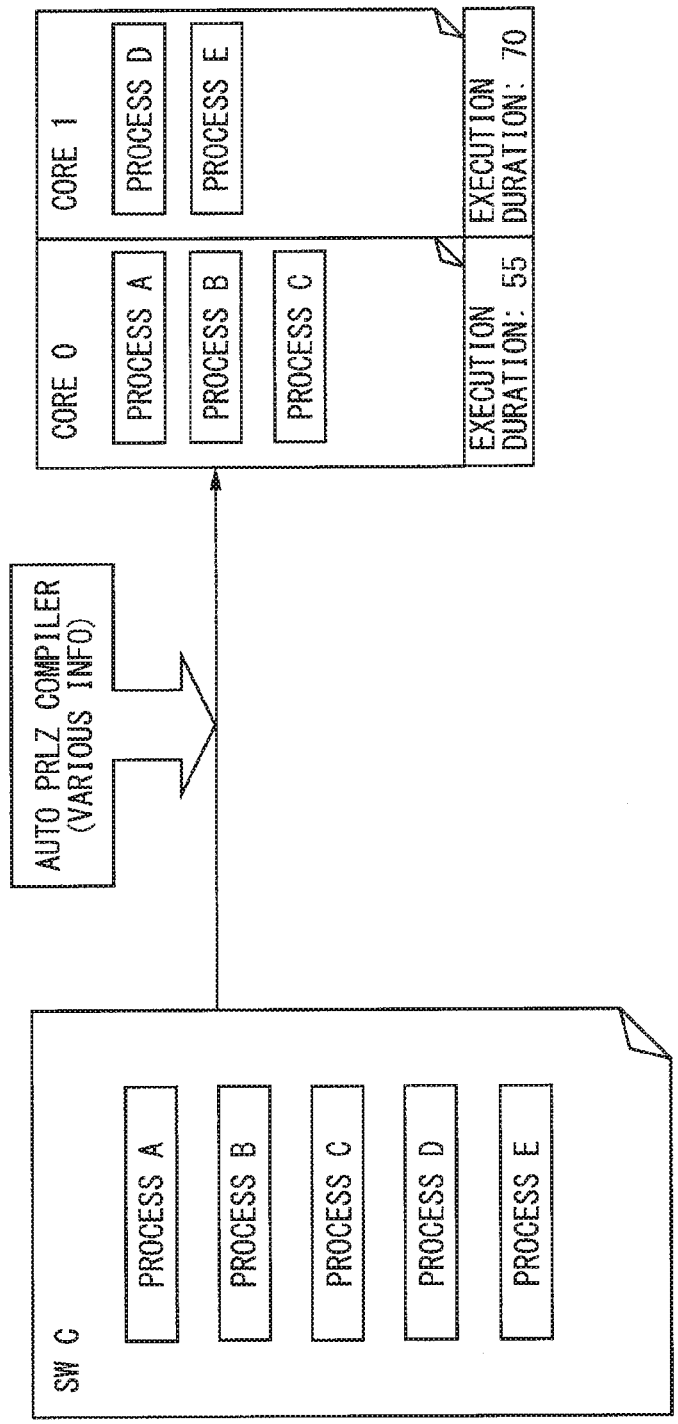
FIG. 15 is a diagram illustrating a parallelization compiling method when data dependency relationship invalidation information exists.

One of specific examples in the generation of the segmented program is illustrated in FIG. 15. As illustrated in FIG. 15, it is assumed that the software C that is a sequential program includes the process A, the process B, the process C, the process D and the process E, and there is a data dependency relationship illustrated in FIG. 13.

First, the data dependency relationship illustrated in FIG. 13 is invalidated. Since the data dependency relationship is eliminated, the parallelizing process is performed so that the overall execution duration becomes shortest. In this example, the process A, the process B, and the process C are assigned to the core 0, and the process D and the process E are assigned to the core 1. In this example, an execution duration of the core 0 is 55, and an execution duration of the core 1 is 70.

In S306, a pseudo data dependency setting is acquired. In this example, it is necessary to reverse the data dependency relationship between the process C and the process D. Specifically, in the data dependency relationship in which the process D is executed after the process C has been completed, the relationship is reversed, and the data dependency relationship in which the process C is executed after the process D has been completed is necessary.

Figure 16:
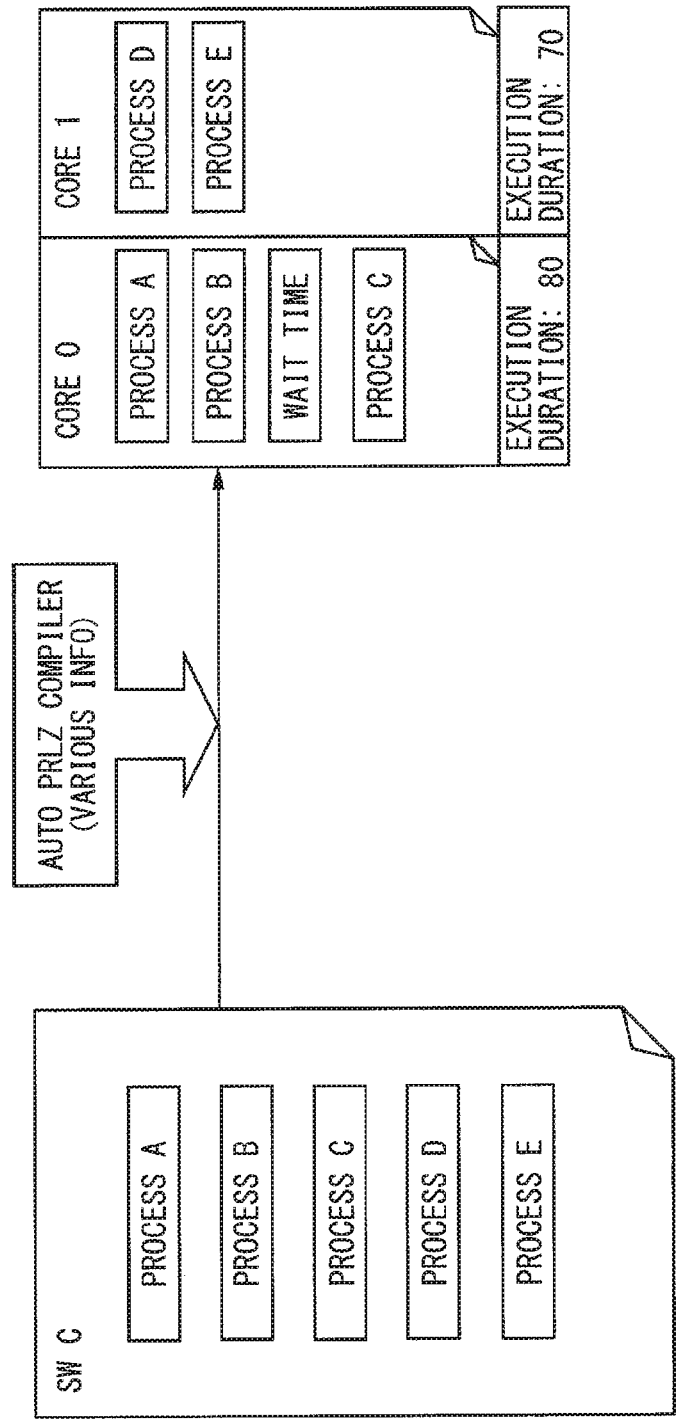
FIG. 16 is a diagram illustrating a parallelization compiling method when data dependency relationship invalidation information and a pseudo dependence condition exist.

In S307 subsequent to S306, a parallelizing process with a pseudo data dependency condition is executed to generate a segmented program. FIG. 16 illustrates an example of the parallelizing process with the pseudo data dependency condition. In the example illustrated in FIG. 16, the process A, the process B, and the process C are assigned to the core 0, and the process D and the process E are assigned to the core 1. In order to prevent the execution order of the process D and the process C from being replaced with each other, the pseudo data dependency relationship is provided. In this example, the execution duration of the core 0 is 80, and the execution duration of the core 1 is 70.

In the present embodiment, in a state where a first macro task included in the two or more macro tasks determined to have the invalidation information, which has a data dependency relationship with another macro task, no longer requires the data dependency relationship with the another macro task with the provision of a data dependency relationship with a second macro task included in the two or more macro tasks, it is determined whether the data dependency relationship with the another macro task is eliminated, or not, and the data dependency relationship between the another macro task and the first macro task can be recovered in compiling the segmented program.

The following will describe a specific example with reference to FIG. 17A and FIG. 17B. In FIG. 17A, it is assumed that there are the respective data dependency relationships between the process X and the process C, between the process A and the process C, between the process B and the process C, between the process C and the process D, and between the process D and the process E. For example, when the process X is a process for giving an initial value c, the process C is a process for giving a value c by calculation a+b, and the process D is a process for obtaining a value d by the value c, a data dependency relationship between the process X and the process D is redundant and therefore eliminated.

In the state shown in FIG. 17A, when the data dependency between the process C and the process D is eliminated, since a result of the process X is required in the process D, the eliminated data dependency relationship between the process X and the process D is recovered as illustrated in FIG. 17B.

Figure 18B:
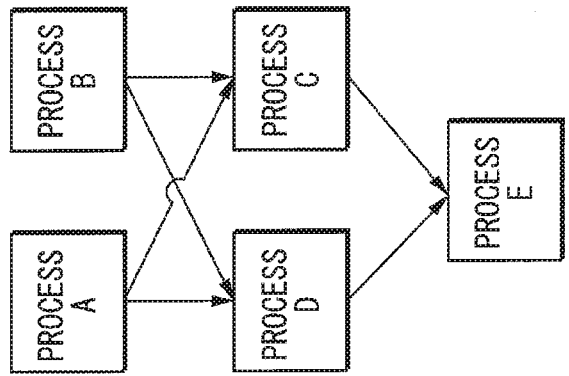
FIG. 18A and FIG. 18B are diagrams illustrating a parallelization compiling method when data dependency relationship invalidation information exists.
Figure 18A:
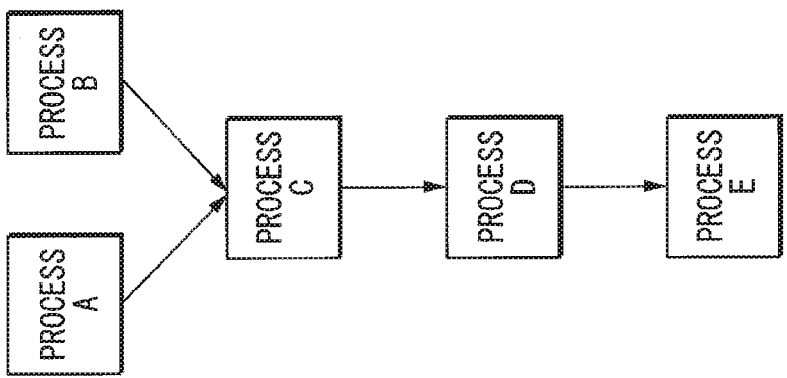

The following will describe another example with reference to FIG. 18A and FIG. 18B. In FIG. 18A, there are respective data dependency relationships between a process A as well as a process B and a process C, between the process C and a process D, and between a process D and a process E. The process A is a process for giving a value a, the process B is a process for giving a value b, the process C is a process for giving a value c by the calculation of a+b, and the process D is a process for giving a value d by the calculation of c+a+b.

In FIG. 18A, when the data dependency relationship between the process C and the process D is eliminated, since process results of the process A and the process B are required in the process D, the data dependency relationships between the process A as well as the process B and the process D are established as illustrated in FIG. 18B.

The following will describe another example with reference to FIG. 19A to FIG. 19C. In FIG. 19A, there are respective data dependency relationships between a process A as well as a process B and a process C, between the process C and a process D, and between a process D and a process E. When a data dependency relationship between the process C and the process D is eliminated, a state of FIG. 19B is obtained from the state of FIG. 19A. In order to eliminate an order change for each processing cycle, a pseudo data dependency relationship from the process D to the process C is established as shown in FIG. 19C from the state shown in FIG. 19B.

In the present embodiment, the parallelization compiling method and the parallelization compiler may be achieved by the multicore processor of the vehicular device, instead of the automatic parallelization compiling device.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A parallelization compiling method for generating a segmented program, which is executable by a multi-core processor, from a sequential program, which is executable by a single-core processor, by parallelizing the sequential program, wherein the sequential program includes a plurality of macro tasks and at least two of the plurality of macro tasks have a data dependency relationship with one another, the parallelization compiling method comprising:
    determining an existence of invalidation information for invalidating at least a part of the data dependency relationship between the at least two of the plurality of macro tasks before compiling the sequential program into the segmented program;
    generating the segmented program by compiling the sequential program into the segmented program with reference to a determination result of the existence of the invalidation information, wherein, when the invalidation information is determined to exist, the at least a part of the data dependency relationship is invalidated before the compiling of the sequential program into the segmented program; and
    assigning another two of the plurality of macro tasks to a same core of the multi-core processor in the compiling of the sequential program into the segmented program in response to a determination that the another two of the plurality of macro tasks have a data dependency relationship that cannot be invalidated by the invalidation information, wherein
    each of the plurality of macro tasks includes a series of procedures that include various operations, assignments, branching processing, and function calls.

2. The parallelization compiling method according to claim 1, further comprising:
    determining whether the at least two of the plurality of macro tasks, which are determined to have the invalidation information, mutually have a dependency of a process synchronization timing when the existence of the invalidation information is determined, wherein,
    when determining that the at least two of the plurality of macro tasks mutually have the dependency of the process synchronization timing, the segmented program is compiled to maintain the dependency of the process synchronization timing by adjusting respective execution time of the at least two of the plurality of macro tasks during the generating of the segmented program.

3. The parallelization compiling method according to claim 2, wherein,
    during the generating of the segmented program, the respective execution time of the at least two of the plurality of macro tasks are adjusted to satisfy a predetermined standard for generating the segmented program and maintain the dependency of the process synchronization timing.

4. The parallelization compiling method according to claim 1, further comprising:
    determining whether the at least two of the plurality of macro tasks, which are determined to have the invalidation information, mutually have a dependency of a process synchronization timing when the existence of the invalidation information is determined, wherein,
    when determining that the at least two of the plurality of macro tasks mutually have the dependency of the process synchronization timing, the segmented program is compiled to maintain the dependency of the process synchronization timing by reversing the data dependency relationship of the at least two of the plurality of macro tasks during the generating of the segmented program.

5. The parallelization compiling method according to claim 1, further comprising:

in a case where (i) the existence of the invalidation information is determined and (ii) a first macro task included in the at least two of the plurality of macro tasks, which are determined to have the invalidation information, has had a data dependency relationship with another macro task but no longer has the data dependency relationship with the another macro task by newly having the data dependency relationship with a second macro task included in the at least two of the plurality of macro tasks, determining whether the data dependency relationship with the another macro task is eliminated, wherein, during the generating of the segmented program, the data dependency relationship between the another macro task and the first macro task is recovered in compiling of the segmented program.

6. The parallelization compiling method of claim 1, wherein the assigning of the another two of the plurality of macro tasks to the same core and the generating of the segmented program in which the data dependency relationship is invalidated accelerates processing of the plurality of macro tasks by executing the plurality of macro tasks independently without considering a processing state of other cores of the multi-processor cores.

7. A parallelization compiler stored in a non-transitory tangible computer readable storage medium as a program product, wherein the parallelization compiler generates a segmented program, which is executable by a multi-core processor, from a sequential program, which is executable by a single-core processor, by parallelizing the sequential program and the sequential program includes a plurality of macro tasks and at least two of the plurality of macro tasks have a data dependency relationship with one another, the parallelization compiler comprising instructions to be executed by a parallelization compiling device, the instructions for implementing:

determining an existence of invalidation information for invalidating at least a part of the data dependency relationship between the at least two of the plurality of macro tasks before compiling the sequential program into the segmented program;

generating the segmented program by compiling the sequential program into the segmented program with reference to a determination result of the existence of the invalidation information, wherein, when the invalidation information is determined to exist, the at least a part of the data dependency relationship is invalidated before the compiling of the sequential program into the segmented program; and assigning another two of the plurality of macro tasks to a same core of the multi-core processor in the compiling of the sequential program into the segmented program in response to a determination that the another two of the plurality of macro tasks have a data dependency relationship that cannot be invalidated by the invalidation information, wherein each of the plurality of macro tasks includes a series of procedures that include various operations, assignments, branching processing, and function calls.

8. The parallelization compiler according to claim 7, further comprising:

an instruction to be executed by the parallelization compiling device and the instruction for determining whether the at least two of the plurality of macro tasks, which are determined to have the invalidation information, mutually have a dependency of a process synchronization timing when the existence of the invalidation information is determined, wherein, when determining that the at least two of the plurality of macro tasks mutually have the dependency of the process synchronization timing, the segmented program is compiled to maintain the dependency of the process synchronization timing by adjusting respective execution time of the at least two of the plurality of macro tasks during the generating of the segmented program.

9. The parallelization compiler according to claim 8, wherein, during the generating of the segmented program, the respective execution time of the at least two of the plurality of macro tasks are adjusted to satisfy a predetermined standard for generating the segmented program and maintain the dependency of the process synchronization timing.

10. The parallelization compiler according to claim 7, further comprising:

an instruction to be executed by the parallelization compiling device and the instruction for determining whether the at least two of the plurality of macro tasks, which are determined to have the invalidation information, mutually have a dependency of a process synchronization timing when the existence of the invalidation information is determined, wherein, when determining that the at least two of the plurality of macro tasks mutually have the dependency of the process synchronization timing, the segmented program is compiled to maintain the dependency of the process synchronization timing by reversing the data dependency relationship of the at least two of the plurality of macro tasks during the generating of the segmented program.

11. The parallelization compiler according to claim 7, further comprising:

in a case where (i) the existence of the invalidation information is determined and (ii) a first macro task included in the at least two of the plurality of macro tasks, which are determined to have the invalidation information, has had a data dependency relationship with another macro task but no longer has the data dependency relationship with the another macro task by newly having the data dependency relationship with a second macro task included in the at least two of the plurality of macro tasks, an instruction to be executed by the parallelization compiling device and the instruction for determining whether the data dependency relationship with the another macro task is eliminated, wherein, during the generating of the segmented program, the data dependency relationship between the another macro task and the first macro task is recovered in compiling of the segmented program.

12. The parallelization compiler according to claim 7, wherein the assigning of the another two of the plurality of macro tasks to the same core and the generating of the segmented program in which the data dependency relationship is invalidated accelerates processing of the plurality of macro tasks by executing the plurality of macro tasks independently without considering a processing state of other cores of the multi-processor cores.

13. A vehicular device comprising:

a multi-core processor, wherein the multi-core processor operates based on a segmented program, which is executable by the multi-core processor and is generated by parallelization from a sequential program executable by a single-core processor, and the sequential program includes a plurality of macro tasks and at least two of the plurality of macro tasks have a data dependency relationship with one another, the multi-core processor is configured to:

- determine an existence of invalidation information for invalidating at least a part of the data dependency relationship between the at least two of the plurality of macro tasks before compiling the sequential program into the segmented program; and
- generate the segmented program by compiling the sequential program into the segmented program with reference to a determination result of the existence of the invalidation information,
- when the invalidation information is determined to exist, the at least a part of the data dependency relationship is invalidated before the compiling of the sequential program into the segmented program; and
- when another two of the plurality of macro tasks have a data dependency relationship that cannot be invalidated by the invalidation information, assign the another two of the plurality of macro tasks to a same core of the multi-core processor in the compiling of the sequential program into the segmented program, wherein each of the plurality of macro tasks includes a series of procedures that include various operations, assignments, branching processing, and function calls.

14. The vehicular device according to claim 13, wherein the multi-core processor is further configured to determine whether the at least two of the plurality of macro tasks, which are determined to have the invalidation information, mutually have a dependency of a process synchronization timing when the existence of the invalidation information is determined, and, when determining that the at least two of the plurality of macro tasks mutually have the dependency of the process synchronization timing, the segmented program is compiled to maintain the dependency of the process synchronization timing by adjusting respective execution time of the at least two of the plurality of macro tasks during the generating of the segmented program.

15. The vehicular device according to claim 14, wherein, during the generating of the segmented program, the respective execution time of the at least two of the plurality of macro tasks are adjusted to satisfy a predetermined standard for generating the segmented program and maintain the dependency of the process synchronization timing.

16. The vehicular device according to claim 13, wherein the multi-core processor is further configured to determine whether the at least two of the plurality of macro tasks, which are determined to have the invalidation information, mutually have a dependency of a process synchronization timing when the existence of the invalidation information is determined, and, when determining that the at least two of the plurality of macro tasks mutually have the dependency of the process synchronization timing, the segmented program is compiled to maintain the dependency of the process synchronization timing by reversing the data dependency relationship of the at least two of the plurality of macro tasks during the generating of the segmented program.

17. The vehicular device according to claim 13, wherein the multi-core processor is further configured to, in a case where (i) the existence of the invalidation information is determined and (ii) a first macro task included in the at least two of the plurality of macro tasks, which are determined to have the invalidation information, has had a data dependency relationship with another macro task but no longer has the data dependency relationship with the another macro task by newly having the data dependency relationship with a second macro task included in the at least two of the plurality of macro tasks, determine whether the data dependency relationship with the another macro task is eliminated, and, during the generating of the segmented program, the data dependency relationship between the another macro task and the first macro task is recovered in compiling of the segmented program.

18. The vehicular device of claim 13, wherein assignment of the another two of the plurality of macro tasks to the same core and generation of the segmented program in which the data dependency relationship is invalidated by the multi-core processor accelerates processing of the plurality of macro tasks by executing the plurality of macro tasks independently without considering a processing state of other cores of the multi-processor cores.

* * * * *